United States Patent [19]

Snow et al.

[11] Patent Number: 5,456,740
[45] Date of Patent: Oct. 10, 1995

[54] HIGH-EFFICIENCY METAL MEMBRANE GETTER ELEMENT AND PROCESS FOR MAKING

[75] Inventors: James T. Snow, Nashua, N.H.; Walter Plante, Auburn; Robert S. Zeller, Boston, both of Mass.

[73] Assignee: Millipore Corporation, Bedford, Mass.

[21] Appl. No.: 263,636

[22] Filed: Jun. 22, 1994

[51] Int. Cl.$^6$ .............................. B01D 71/02; C22C 1/04
[52] U.S. Cl. .................... 96/11; 55/485; 55/486; 55/523; 55/524; 55/DIG. 5; 75/769; 252/181.1; 419/2; 419/6; 419/24; 419/39; 419/54
[58] Field of Search .................. 95/56; 96/4, 11; 55/485, 486, 523, 524, DIG. 5; 75/255, 751, 765, 769; 252/181.1; 419/2, 5, 6, 24, 29, 38, 39, 42, 54, 55, 68

[56] References Cited

U.S. PATENT DOCUMENTS

| | | | |
|---|---|---|---|
| 2,300,048 | 10/1942 | Koehring | 419/2 |
| 2,309,018 | 1/1943 | Shaw | 419/2 |
| 3,926,832 | 12/1975 | Barosi | 419/2 X |
| 4,135,621 | 1/1979 | Turillon et al. | 96/4 X |
| 4,183,369 | 1/1980 | Thomas | 55/523 X |
| 4,312,669 | 1/1982 | Boffito et al. | 75/177 |
| 4,528,003 | 7/1985 | Dittrich et al. | 96/4 |
| 4,699,637 | 10/1987 | Iniotakis et al. | 55/524 X |
| 4,758,272 | 7/1988 | Pierotti et al. | 55/523 X |
| 4,818,317 | 4/1989 | Otaka et al. | 55/523 X |
| 4,865,630 | 9/1989 | Abe | 55/524 X |
| 4,971,696 | 11/1990 | Abe et al. | 96/11 X |
| 5,114,447 | 5/1992 | Davis | 55/485 |
| 5,196,380 | 3/1993 | Shadman | 502/4 |
| 5,240,480 | 8/1993 | Thorogood et al. | 55/524 X |
| 5,242,559 | 9/1993 | Giorgi | 204/181.4 |
| 5,310,414 | 5/1994 | Najjar et al. | 55/523 X |
| 5,342,431 | 8/1994 | Anderson et al. | 96/4 X |

FOREIGN PATENT DOCUMENTS

| | | | |
|---|---|---|---|
| 59-177117 | 10/1984 | Japan | 95/56 |
| 63-004829 | 1/1988 | Japan | 96/11 |
| 0309965 | 9/1971 | U.S.S.R. | 55/523 |

*Primary Examiner*—Robert Spitzer
*Attorney, Agent, or Firm*—Andrew T. Karnakis

[57] ABSTRACT

A getter-filter composite membrane element, comprising a sinterable getter material and a sinterable metal filter material, the composite element defining a matrix of substantially interconnected pores. Membrane elements may be comprised of at least three alternating layers of a first sinterable getter material layer and a second sinterable metal filter material layer, the first getter layer being located between the second filter layers, the second layers acting to hold the getter layer, and to retain the getter particles. Also disclosed is a method of making the getter-filter element.

28 Claims, 5 Drawing Sheets

HIGH-EFFICIENCY METAL MEMBRANE GETTER ELEMENT AND PROCESS FOR MAKING

BACKGROUND OF THE INVENTION

1. Field of the Invention

The present invention generally relates to gas filtration and purification. In particular, the invention is a novel integral, all-metal gas filter and purifier combination, with high efficiency, low outgassing, and superior purification characteristics that make it useful as a point-of-use getter-filter combination for semiconductor process gases.

2. Description of the Prior Art

Semiconductor manufacturing is constrained by the limitations of purity. In the chemical vapor deposition of the dopant atoms to silicon, a critical aspect of the process involves the absence of any homogeneous or heterogeneous impurities. For example, the presence of minute particle or trace oxygen or moisture impurities can significantly damage an entire silicon wafer representing many dollars of potential end-product. To that end, an entire industry has developed concerned with the filtering and purifying of the gases that may come into contact with the semiconductor product during its manufacture.

Clean rooms equipped with HEPA (High Efficiency Particulate Attenuator) filters are the first line of defense. Process equipment is located within "clean rooms" that are filled with carefully filtered air. The design of the equipment itself endeavors to minimize particle shedding, outgassing, and contamination from the materials used to transport and deliver high-purity gases such as argon, nitrogen, silane, arsine, hydrochloric acid and phosphine. An important component in the gas delivery is the filter which insures that particulate contamination does not reach the point where the gas is discharged onto the work (point-of-use). These filters must not only remove any particulate material, but also must not add any gaseous contamination to the high purity gases. In addition, the gas delivery systems must also be as compact as possible to eliminate contamination, both particulate and gaseous, which might arise from either the installation of such systems, or the normal wear associated with usage. Therefore the filters must not only remove particulate material and not be a contributor of gaseous impurities, but they must also be as compact as possible and have small internal and filter volumes.

Various filters are used for filtration of such gaseous fluids to insure ultra high levels of purity in terms of particulate contamination. These include: organic membrane filters, ceramic filters, filters formed from porous metal structures and filters formed from metal fibers. Although some of these various filter media are capable of providing particulate contamination control to levels less than one part per million or greater, they are characterized by large filter areas. Due to the large flow area required to sustain flow at reasonable pressures and maintain low face velocities to insure particulate retention, gaseous impurities such as moisture, oxygen and especially hydrocarbons are often present at detectable levels (parts per million). This contamination can occur during manufacture of the filter, installation of the filter when it is exposed to an atmosphere other than a high purity gas, or even as a result of outgassing from the material in which the filter is packaged. In addition, large filter volumes require relatively larger housings to contain them. This in turn results in a greater likelihood of contamination due both to installation and usage and the need for larger gas delivery systems to fit the filters.

Present metal filters are made from metals that include stainless steel, nickel, or nickel alloy sintered-powder types such as the Wafergard® II SF (Millipore Corporation, Bedford, Mass.), the Ultramet-L™ (Pall Corp, Glen Cove, N.Y.), and the Molt GasShield™ line of filters (Mott Metallurgical Corporation, Farmington, Conn.) (see U.S. Pat. No. 5,114,447 (Davis)). Such filters, being all metal, exhibit low outgassing, high efficiency, corrosion and temperature resistance, and high structural strength with low porosity and gas throughput. The low porosity has continued to be a drawback for typical sintered metal powder filter elements. Porosities for the above filters range at best from 40 to 44%, limiting the flow-through characteristics of these filters. The low porosities are inherent in the processes used to manufacture sintered metal powder filters. In such a process, the powders are typically compacted into a mold to form a "green form," then sintered to join the metal particles together to impart the necessary strength. The final filter elements (or "membranes") may be cut from a flat sintered sheet of metallic powder, or molded into the final shape in the molding step. The temperatures at which the sintering is conducted are critical factors in determining the final porosity. Higher temperatures lead to increased strength, but lower porosity; lower temperatures lead to decreased strength and higher porosity. Until now, the final porosity was limited to about 45% in the sintered metal powder art.

Removal of trace contaminant gases is also an issue in semiconductor manufacturing. Current gas purification devices utilized in the microelectronics industry consist of two separate modules integrated into one package, i.e. an upstream purifier (containing getter alloys, organometallic or inorganic resin-based or reactive micro matrix materials) for removal of molecular contaminants followed by a downstream particle filter for removal of particles. These particles may already have been present in the gas stream and/or were generated by the purifier. Representative examples of these products include purifiers sold by SAES Pure Gas, Ultrapure, Semi-gas and Millipore. For example, Millipore sells a point-of-use purifier called the Waferpure® Mini XL that consists of two separate pans, a small quantity of purification material and a stainless steel filter, contained within a single stainless steel housing that measures five inches in length and one inch in diameter. Other larger purifiers contain two separate housings connected in series, i.e. an upstream housing that contains the purification material followed downstream by a suitable gas filter. Purifers that consist of separate purification and filtration modules, regardless of how packaged, can only function properly in one flow direction. Reverse flow or sudden back diffusion might result in the release of fine particles from the purifier bed through the retaining frit and into the gas line.

Getters have been used to absorb or chemically bind trace amounts of gases such as oxygen, carbon monoxide, hydrogen and moisture, thereby maintaining vacuum in sealed devices, and for purifying inert gases. In the past, zirconium and titanium sponge have been used, but must operate at elevated temperatures (700°–900° C.). Other non-evaporable gettering alloys have been developed which are made from metal alloy powders or their hydrides, and have small size (less than 125 µm) and lower operating temperatures (350° C.). The powders are packed into columns, admixed with a supporting bed, and used in-line to absorb or catalytically remove trace gases. These packed beds have the chief drawback of the generation of fines due to mechanical abrasion of the particles under conditions of normal pressure and flow fluctuations. Getter alloys have included combinations of Zr, Al, Ni, Fe, Ti, Ta, Th, Hf, Nb, and uranium. U.S. Pat. No. 4,312,669 (Boffito, et al.) discloses a ternary alloy of Zr-V-Fe that may be pressed into pellets or attached to a support, or alternatively chemically bound and sintered. The finely divided alloy powders are cast or pressed into structures, or they are combined with a support such as in U.S. Pat. No. 5,242,559 (Giorgi), which describes a getter electrolytically bound to a support such as a metal wire or strip, or metal-coated ceramic, in combination with an antisintering agent. The bound getter powder, antisintering agent and support are then heat treated (sintered) under vacuum to make a porous surface coating. However, these coatings are not useful for forming filter-type structures because they are restricted to having a support surface. In addition, since sintering is aided with a binder, it is possible that portions of the binder may slough off during a point-of-use application, again generating fines that may find their way into the process stream.

A recent development in this area is a reactive carbon/ ceramic membrane for filtration and purification of gases, which has a reactive metal and is applied as a layer. U.S. Pat. No. 5,196,380 (Shadman) discloses a reactive membrane for removal of homogenous and heterogenous impurities from gases, the reactive membrane comprising a porous ceramic or carbon substrate upon which a carbon layer is deposited, and a layer or layers of reactive reduced metal on the carbon, the metal being selected from the group consisting of manganese and alkali metals. The metal is first deposited in non-reduced form and subsequently reduced. Chemical vapor deposition and solution deposition techniques are disclosed for depositing both the carbon and the metal. This device, however, has the following manufacturing and performance problems. For the filter element utilized as the starting material, the pore size needs to be slightly larger than the final product since layers of material will be deposited on the membrane and thereby decrease the pore size. This creates potential manufacturing difficulties for reproducibility and pore plugging. In addition, some of the membrane element downstream should be left uncoated since the reaction of the coated reactive metal with oxidant impurities may provide coated material with poorer adhesion properties to the membrane support. This would lead to shedding and particulating. The uncoated membrane material downstream would be available for filtering these particles, but the pore size would be larger than optimal for reasons previously discussed. Efforts to improve pore size uniformity by decreasing the loading level of active material would result in a device with insufficient capacity for impurity removal. The efficiency and other characteristics of this membrane are unreported.

There exists a need for a purifier function integrated within an all-metal filter having good porosity and gas throughput. The integral combination of a getter purifier and a filter would allow for all of the positive aspects of highly porous metal filters and the gas impurity-removing capabilities of getters, with less outgassing and particulate shedding problems, in one point-of-use device.

SUMMARY OF THE INVENTION

In accordance with the present invention it has been found that highly porous, high-flow getter-filter devices made from a combination of filamentary metal powders and a getter material can be made which require a fraction of the filter volume found in existing filters and which also remove traces of impurities in selected gases. The filter-purifiers of the present invention retain the high level of particulate efficiency (less than one part per million passage through the filter) found in existing filters, while also scavenging trace contaminant gases. The getter-filter of the present invention has minimal internal volume and is highly compact, resulting in very low contaminant generation due to exposure to atmospheres other than high purity gases and the wear associated with usage. In addition, the present invention shares other advantageous characteristics of porous metal filters, namely good mechanical and thermal properties allowing operation at elevated temperatures and high differential pressures, and the absence of particulate shedding associated with prolonged usage.

Accordingly, the invention is directed to a getter-filter composite membrane element, comprising a sinterable getter material and a sinterable metal filter material, the composite element defining a matrix of substantially interconnected pores. Preferred membrane elements may be comprised of at least three alternating layers of a first sinterable getter material layer and a second sinterable metal filter material layer, the first getter layer being located between the second filter layers, the second layers acting to hold the getter layer, and to retain the getter particles. Also disclosed is a method of making the getter-filter element comprising the steps of: making a sintered getter element; placing the sintered getter element in a mold and depositing a sintered dendritic metal layer on a first face of the getter element, thereby making a two-layer composite element; flipping the two-layer composite element thereby preparing the second face for layering; and making a second metal layer on the second face of the two-layer element, thereby making a multi-layer getter-filter composite membrane element.

It is an object of the present invention to provide both a purifier and a highly efficient high-porosity metallic membrane filter element useful as a point-of-use getter-filter in the semiconductor industry. The compactness of the invention allows a substantial savings in space utilized in the process instrumentation, reduced outgassing due to decreased internal surface area, and reduced pressure drop over the length of the filter.

It is another object of the invention to provide a getter-filter membrane element that may be formed in any of numerous shapes for inclusion into a filter housing.

BRIEF DESCRIPTION OF THE DRAWINGS

FIGS. 2 (*a–f*) are a schematic depiction of the process of making the getter-filter element of FIG. 1.

DETAILED DESCRIPTION OF THE PREFERRED EMBODIMENTS

The invention discloses a high-efficiency, high-porosity all metal getter-filter composite membrane element and a method for making it. Getter-filter devices incorporating the membrane exhibit increased fluid throughput, decreased pressure loss, substantially lower outgassing, decreased size and complexity, and the ability to absorb or chemically remove trace gaseous impurities. These characteristics make this getter-filter ideal as a point-of-use gas filter/purifier in the semiconductor, and related, industries.

The following terms are used in this application. The term "porosity" is defined as the amount of pore volume per total volume of the membrane element. Per cent porosity is the pore volume divided by the total membrane element volume, multiplied by 100.

As used herein, the term "metallic" is meant to describe all metal-containing materials. This includes, but is not limited to, pure metals, metalloids, metal oxides, metal alloys, metal hydrides, and similar combinations known to one of ordinary skill in the chemical or metallurgical arts.

As used herein the term "membrane element" describes the wafer-like product of this invention. It is characterized in that it has a high internal pore volume, excellent structural rigidity and strength, and low pressure drop when fluids, specifically gases, are passed through it. Other shapes may be used in addition to wafers.

As used herein the term "matrix" describes a physical structure comprising a network of interrelated pores or crevice-like areas. The matrix, while generally a uniform structure, is not necessarily 100% uniform. Some pores may be completely unconnected to other pores, and thus may not be connected to the matrix. "Substantially interconnected" can thus be interpreted to mean that the majority of the pores will touch upon or share elements of at least one other pore, thereby allowing communication between the pores.

As used herein the term "dendritic" refers to the tree-like appendages that the metallic particles display. The dendritic property of the metallic powder makes it possible to attain a higher pore area than with non-dendritic metal powders because of the interactions of the branches with each other. Other metal powders which are or may be made dendritic come within the scope of this invention.

As used herein the term "green form" is a term well-known in the sintering art. It refers to the compressed metal powder structure before it is sintered. The green form displays a higher porosity than the final sintered membrane, but is very fragile.

As used herein the term "sinterable dendritic material" refers to any matter whose individual particles have a highly branched external surface, the particle also being capable of being sintered.

As used herein the term "substantially uniform" when used to describe the low-density bed means that there are few or no significant local variations in the density of the air-laid bed.

Figure 1:
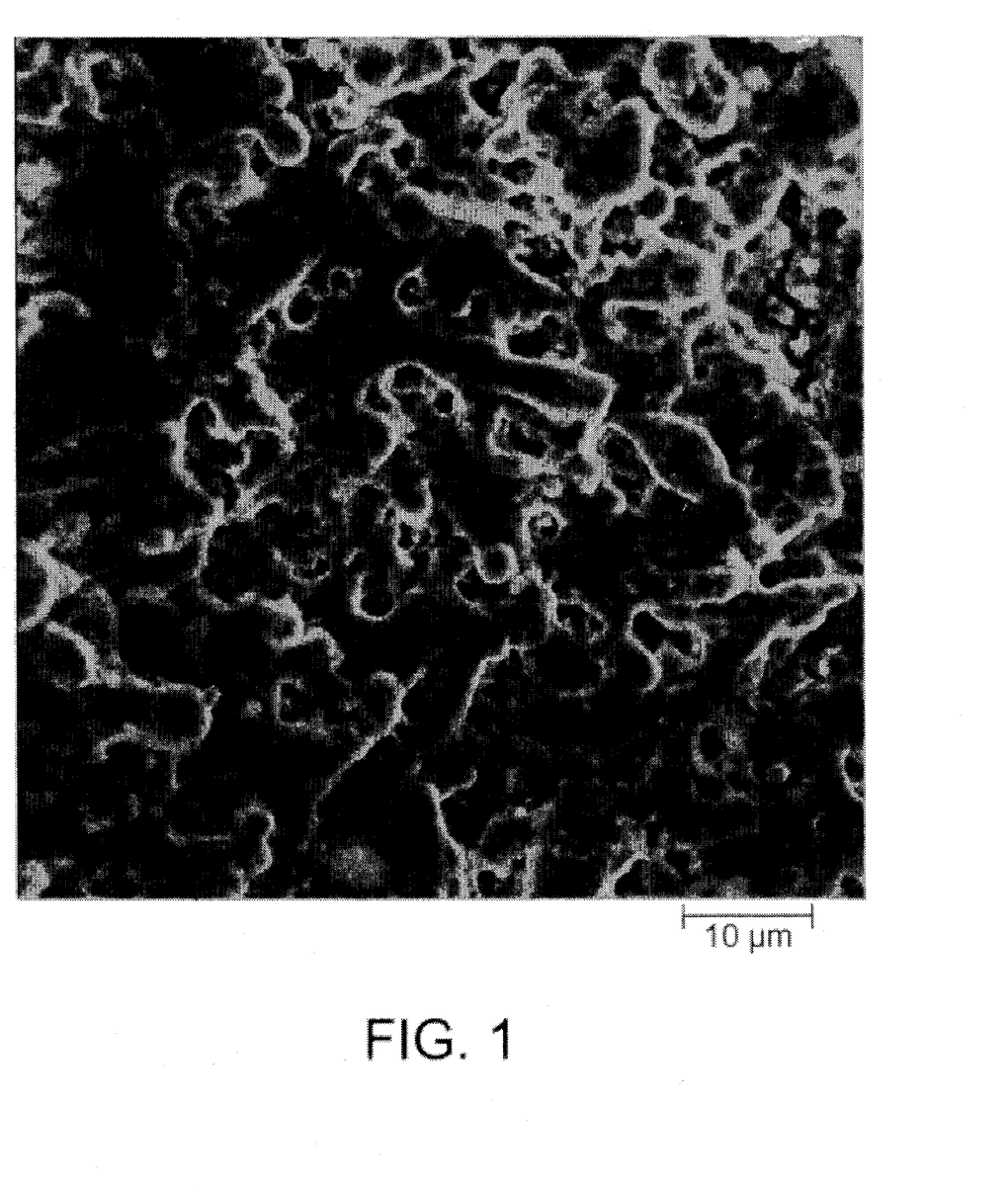
FIG. 1 is a scanning electron microscopic view of the getter-filter composite membrane of the present invention.

The invention is directed to a getter-filter composite membrane element, comprising a sinterable getter material and a sinterable metal filter material, the composite element defining a matrix of substantially interconnected pores. As shown in FIG. 1, the getter-filter is a wafer-like membrane that appears substantially homogenous. However as shown in FIG. 3, the membrane is comprised of at least three individual layers that are laid down separately. As shown in FIG. 2, the process for air-laying the individual layers is disclosed. This process is related to the airlaying process described more fully in U.S. Ser. No. 08/281,047, filed Jul. 27, 1994, for "High Efficiency Metal Membrane Element, Filter, and Process for Making," incorporated herein in its entirety.

The purifier/filter arrangement of this invention integrates the two removal capabilities, i.e. for molecular and particulate impurities, into a single composite element. This provides a better utilization of purpose and surface area. It also provides improved mass transport efficiency due to a shortened diffusion distance of impurities to a reactive wall. In resin-based purifiers, the overall impurity removal rate is limited by mass transport resistance-much of which can be attributed to diffusion of impurities within the pores of the support beads to the active sites. In the getter-filter of the present invention, all of the gas flows through the pores so that impurities are brought close to the reactive surface by convective mass transport. The impurity molecules must then diffuse a maximum distance of one pore radius. This, in theory, provides for better overall removal efficiency and lower impurity outlet concentrations.

This invention consists of a getter-filter element fabricated from a metal, metal hydride, metal alloy or a mixture of these components that in itself is reactive towards gas impurities rather than depositing a reactive metal onto an inert membrane support. The getter-filter element is manufactured from a getter alloy or pure metal that is unreactive at ambient conditions due to a protective oxide coating but behaves as a getter for molecular impurities at either elevated temperatures or at room temperature after a prior elevated temperature activation step. The degree of protection afforded by the oxide coating under ambient conditions is dependent on the particular metal or alloy utilized. Although the oxide coating may enable periodic exposure to ambient atmosphere, the metal or alloy should be handled in inert conditions as much as possible. Suitable alloys include getter alloys formulated in-house or commercially available alloys, e.g. a binary alloy of 84% Zr-16% Al (SAES St 101) or a ternary alloy of Zr-Ti-Ni. Suitable pure metals that have a protective oxide coating of the bulk reactive metal include aluminum, calcium, hafnium, magnesium, manganese, strontium, titanium, vanadium, and zirconium. The preferred getter materials are Zr and Ti and alloys thereof.

The filter element is fabricated as disclosed herein, and in U.S. Ser. No. 08/281,047, filed Jul. 27, 1994 which describes the manufacture of sintered all-nickel filter elements with the pore size selected for optimal particle removal. The getter-filter element is fabricated from fine powders using existing or modified existing sintering methods. Filters produced by these methods have been shown to remove particles from gases with greater than 99.9999999% (9LRV) efficiency at a most penetrating particle size of 0.1 μm and at the maximum face velocity for the application. The getter filter element is then welded into a metal housing so that polymeric seals are excluded from the device. The housing materials may be 316L stainless steel, nickel or Hastelloy as are already found in filter and purifier devices used in the microelectronics industry. The device may have any of the inlet and outlet connections that are commonly found in gas supply systems in the microelectronics industry. The getter-filter avoids the manufacturing problems of reactive filters (U.S. Pat. No. 5,196,380), and can periodically be handled in air before activation. At room temperature a surface oxide coating on the metal permits the fabrication of the filter and installation in the fab. Upon installation on the gas line and purging, the filter is heated to the desired temperature for activation to permit molecular impurity removal while maintaining particle removal. Although a change in pressure drop may occur with the getter filter, no particle shedding will occur since the molecular contaminants are diffused into the bulk metal of the filter. Capacity is greater than the reactive filters since the bulk metal is utilized for impurity removal rather than just a surface area limited reaction. In addition, the getter-filter can operate in either flow direction and thus provide protection against back diffusion of molecular or particulate impurities. This solves a technical limitation that existing purifiers have, as previously discussed. In instances where prolonged heating of the filter is not possible, the filter could be operated at room temperature with occasional high temperature activation to diffuse the adsorbed surface impurities into the bulk.

Metal particles, especially reactive getter particles, are difficult to handle, i.e. pyrophoric, below a particle size of ca. 325 mesh. One needs small particles (<15 microns) to form a good sintered filter. The idea of being able to handle pyrophoric metal getter particles out in the room air while one is trying to make a filter is considered difficult, if not impossible. Certainly, commercial manufacture of filters incorporating pyrophoric particles is problematic.

The inventors have discovered that a surface oxide coating on the particles will protect them from further reaction and enable their manipulation in room air. However, for those skilled in the art of working with getter materials, particles of this small size once passivated are considered completely exhausted with no purification potential remaining. Surprisingly, this is not the case. The getter material still has significant remaining capacity, even after all the processing steps of forming the filter media have been completed.

FIG. 2 is a schematic generally describing the process of making a getter-filter metallic membrane element. In accordance with the process of the preferred embodiment, a highly porous getter-filter metal membrane is prepared by employing a variety of novel operations. Generally, the steps of the process begin with first depositing a uniform bed of metal powder mixed with getter powder by air-laying a bed of getter-metal mixed powder to form a highly uniform, exceedingly low-density powder bed whose apparent density is equal to or less than that of the powder as it is obtained from its container (FIG. 2(a)). The next steps are the low-pressure press of such a bed to form a high-porosity semi-self-supporting green form (FIG. 2(b)), and then the sintering of the green form to produce a self-supporting highly porous metal getter membrane with porosity exceeding 55% (FIG. 2(c)). Step (d) is a second processing to further compact the sintered element. Step (e) is another layering of metal only. Thereafter, the element is removed from the mold, flipped over and a third and final metal layer is applied to form a composite membrane. Other arrangements and mixtures of getter and metal powders are possible including the use of only getter powder are known to those skilled in the art.

Figures 2A, 2B:
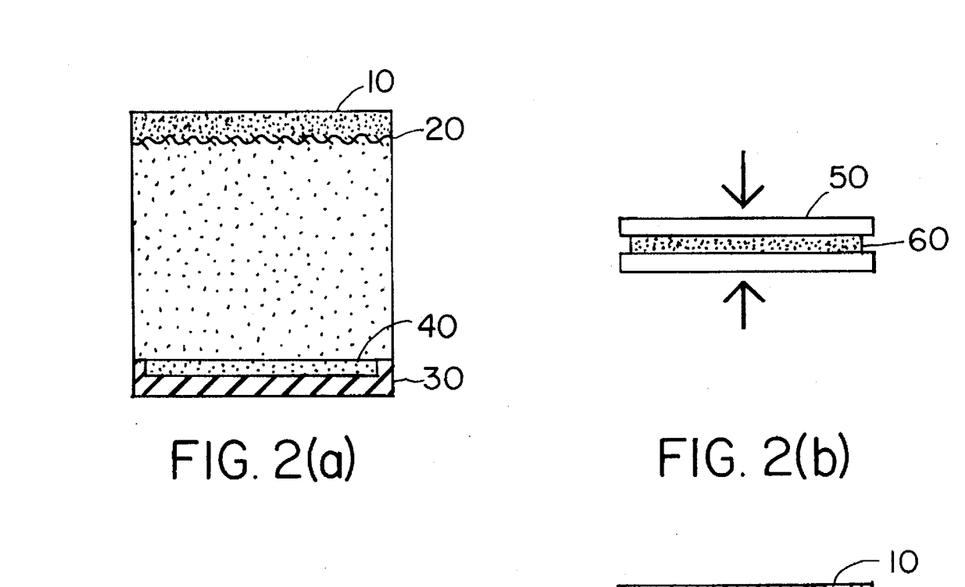
Figure 3:
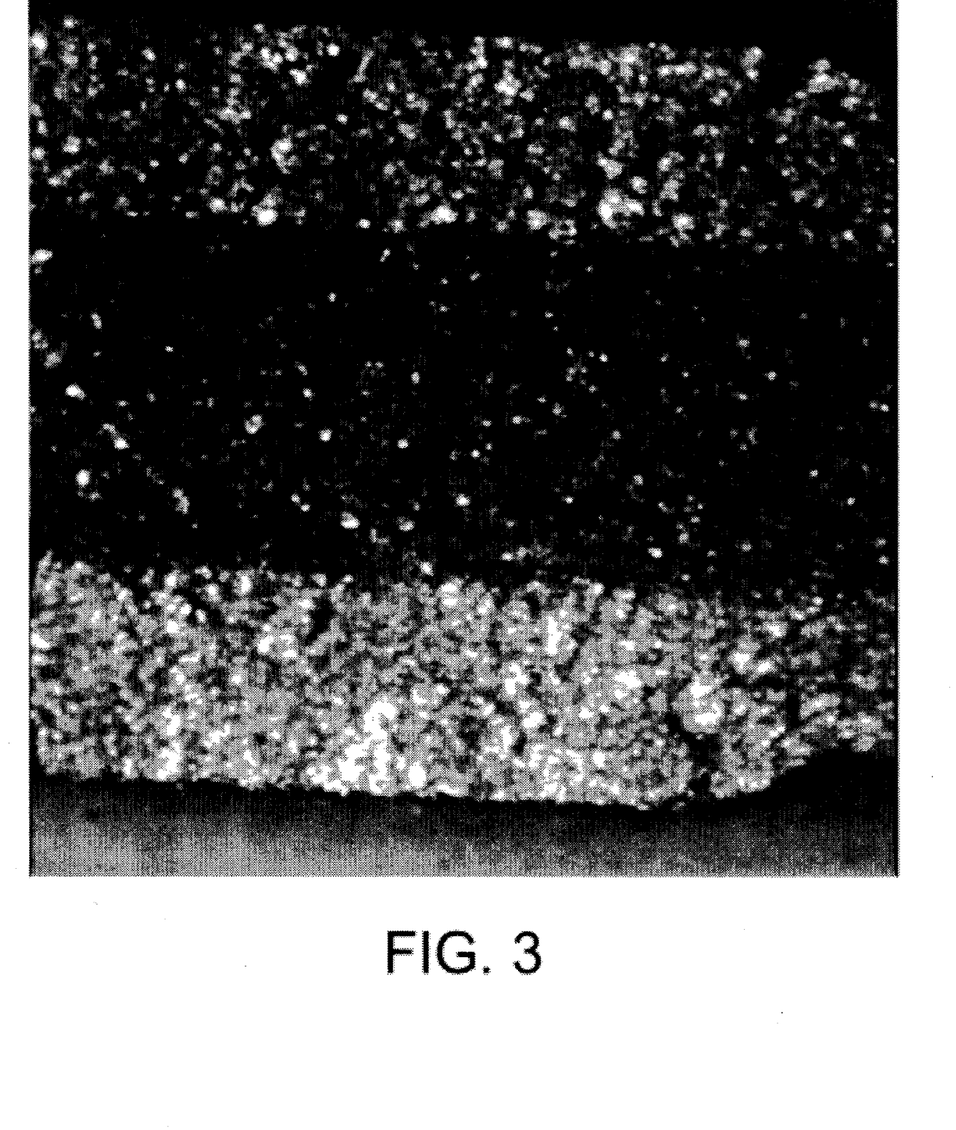
FIG. 3 is a microscopic photograph of a cross-section of the getter-filter composite membrane of the present invention showing the layered structure of one embodiment of the device.

FIG. 2(a) depicts the first step of air-laying. As mentioned above, the formation of an exceedingly low-density bed of high uniformity is accomplished through the use of air-laying procedures. The term "air-laying" as used herein refers to the procedure whereby a predetermined mass of powder 10 is sifted through a screen sieve 20 and allowed to fall under the influence of gravity into a mold 30 below of fixed volume. Since the powder is "fluffed up" as a cloud of suspended particles in this manner, its density becomes lower than that of the packaged powder. The distance the powder falls before coming into contact with the mold will necessarily vary depending on the area and shape of the mold. A variety of individual molds can be used depending upon the final shape and size of the desired product. For example, a 13-cm diameter round mold requires a falling height of at least 25 cm when using filamentary nickel powders to insure a powder bed 40 of substantially uniform thickness and density. A larger diameter mold would require a larger falling distance. One of ordinary skill in the art will be able to determine this height through the use of routine experimentation, given the examples set forth herein. The bed 40, formed in the manner described, has a density equal to or less than, and preferably less than, that of the apparent density of the powder 10. Apparent density is determined following the procedure outlined in ASTM B 329. For filamentary nickel powders with an apparent density of approximately 1.0 g/cc the air-laid bed density can be as low as 0.7 g/cc.

The getter-metal mixed powder may have any percent composition range of getter to metal powder that allows sufficient contaminant removal capacity, and also structural support. Porosity varies with metal content. A preferred range is from 25% getter to about 50% by weight, with a most preferred amount being 25%.

Now with reference to FIG. 2(b) the air-laid bed 40 formed as described is then pressed using compressing means 50 to the desired thickness using relatively low pressure, forming a green form 60. The resulting porosity ranges from 80–90%. The degree of pressure required necessarily depends on three variables, namely the density of the air-laid bed 40, the thickness of the bed, and the desired thickness of the pressed green form 60. For example, for a bed with a density of 0.8 g/cc and a thickness of 0.6 cm, a force of 30 kg/cm$^2$ (430 psi) is required to obtain a green form thickness of 0.4 cm. The density of such a green form would be 1.3 g/cc and have a porosity of 85%. The green form 60 is self-supporting only to the extent that it can, with care, be removed from the mold while retaining its structure. However, the introduction of relatively minor stress on green form 60 can cause it to lose its integrity.

Figure 2C:
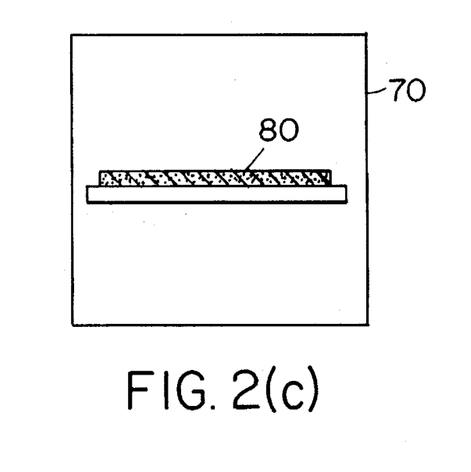

Now with reference to FIG. 2(c), self-supporting green form 60 is given additional strength through the sintering step depicted therein. Generally, sintering is accomplished by heating a metallic powder in a sintering oven 70 to a temperature below its melting point in the presence of an inert or reducing atmosphere, or in vacuum. One of ordinary skill in the art of sintering will be able to determine the specific atmospheric conditions in which to sinter. The temperature and, to a lesser degree, the duration of the sintering process, are two critical factors which determine the final dimensions, and hence porosity, of the metal membrane. The porosity of the sintered green product 80 typically decreases to 70–80%. This occurs as a result of both sinter bonding of the powder particles and shrinkage of the membrane. A lower temperature and shorter sinter duration result in a membrane with smaller degrees of both sinter bonding and shrinkage. For example, a green form with a porosity of 80% sintered at 950° C. for 5 minutes results in a membrane with a porosity of 58%. The same green form sintered at 800° C. for 5 minutes results in a membrane with 72% porosity. It is apparent that a decrease in temperature results in an increase in resultant porosity. Applicants have discovered that sintering at even lower temperatures is possible. However, a lower limit to temperature does exist insofar as a given metal will not sinter unless given sufficient heat. The lower limit for sintering filamentary nickel powder with a Fisher size of 2–3 μm has generally been found to be between about 500 and 600° C. The preferred form of the invention utilizes temperatures between about 675° and 725° C., as this results in the appropriate membrane porosity and dimensions when combined with the proper formation of the air-laid bed and green form. A most preferred form of the invention utilizes a sintering temperature of 675° C.

Figure 2D:
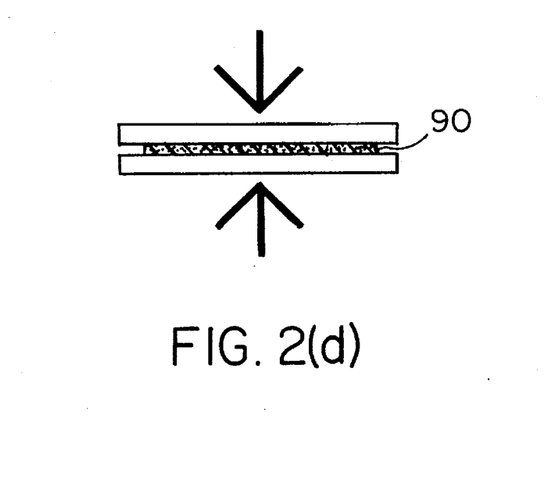

As shown in FIG. 2(d), the next step is to press the sintered green form 80 in compressing means 50 to attain the final dimensions desired. The pressing is generally done at a higher pressure than the initial compaction step, given the fact that the sintered form 80 is now much more rigid. The pressures generally used in this step are usually from about 600 to 1100 psi. In a preferred embodiment, the sintered green form is pressed at greater than 1000 psi. This step reduces the porosity of the product to its final porosity value to produce getter layer 90. The final porosity is typically greater than 55%, and in a preferred embodiment greater than 65%.

Figure 2E:
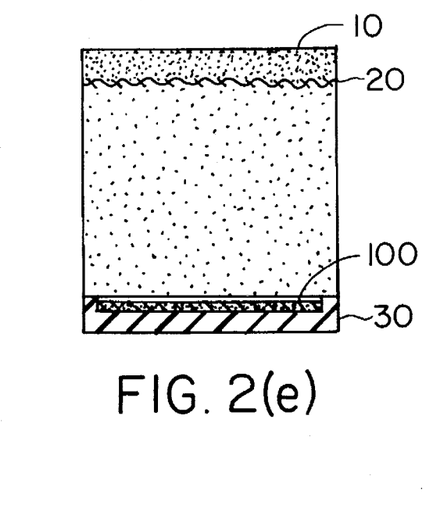

Step (e) is depicted in 2(e), which shows a second layer being made on top of the first getter layer 90. The second layer is made of a dendritic sinterable metal, preferably nickel (INCO 255). This step is performed with the previously made getter element 90 in the mold 30, so that the second layer is incorporated directly into one face at the getter layer, resulting in the composite layer 100. Steps (a)–(d) are repeated, the two layer element is removed and flipped over in the mold, and the third layer (nickel) is formed on the opposite side of the getter layer in the same fashion. This procedure encases the getter in a sandwich-style element (see FIG. 3). The sintering temperature in step (e) for the getter material will depend on the specific getter selected. For example, in Example 1, the getter composed of Zr(82): Ti(10): Ni(5):O(3) (the numerals in parentheses representing the weight percent of each element) is sintered from 775°–825° C., preferably at 805° C., for 20 minutes. To sinter the carrier material only, the range is from 650°–750° C., for about 20 minutes.

Figure 2F:
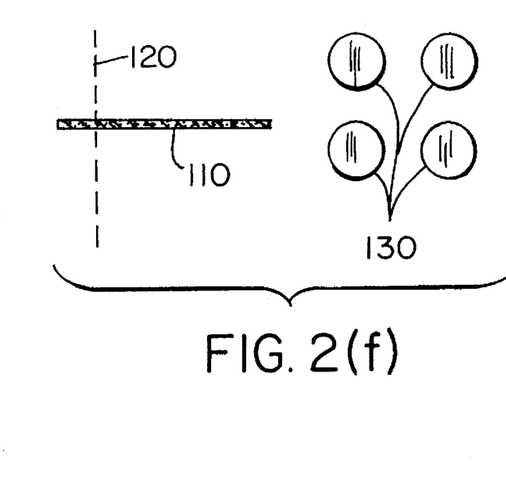

As shown in FIG. 2(f), the metallic membrane element sheet 110 may be cut into forms that allow construction of useful filter devices. In a preferred embodiment, wire electrical discharge machining (EDM) is employed for this purpose. Wire EDM cutting is defined as the cutting of metals with a thin wire 120 through which a high electrical current is passed. This method of cutting the membrane element sheet 110 into membrane elements has given the best results. However, one of ordinary skill in the art may be able to adapt other cutting methods that may work equally well. For instance, cutting with an abrasive wheel or laser may effect adequate separation. In a preferred embodiment the size of the nickel membrane element 130 is approximately 1.2 cm in diameter and 0.25 cm in thickness.

Referring now to FIG. 2(f) the membrane elements 130 are low-temperature vacuum-baked to remove any volatiles introduced during the process. The temperature is usually less than 200° C.

EXAMPLES

Example 1—Formation of sintered getter-filter element. Getter material: Fine (<20 μm diameter) powder made from a getter alloy (example: Zr 82: Ti 10: Ni 5: O3) Carrier material: Suitable dendritic material which readily forms a green form under low pressures (<1000 psi). (example: INCO Nickel powder type 255) The following steps were carried out to make a getter-filter element:

A) A combination getter powder/carrier powder (25–50% getter by weight) was air-laid into the mold according to the procedure described in U.S. patent application Ser. No. 08/071,554, incorporated herein earlier and modified herein for this multi-layer element;

B) The powder was subjected to a low-force press to mold a green form at a pressure of from approximately 500–1500 psi;

C) The green form was then subjected to vacuum sintering at a temperature suitable to thoroughly sinter the carrier material and the partially sintered getter material, which may be from about 775°–825° C., preferably at 805° C. for 20 minutes;

D) A second pressing at a higher force press was applied to the sintered form to obtain a desired thickness at about 2500–5000 psi;

E) To create a second and subsequent layerings, the carrier powder was then air-laid onto the sintered getter/carrier material (which was previously replaced into the mold), and the following steps were carried out:

— Low force press to form green mold (500–2500 psi);

— Vacuum sinter at temperature to sinter carrier material only (650°–750° C.) for 20 minutes;

— High force press to desired thickness (2500–5000 psi); and

— Wire EDM to desired dimensions.

Example 2—Construction of a Getter-Filter

The filter element in Example 1 was welded into a stainless steel housing and VCR® male connections welded onto the ends to enable connection to a high purity gas stand. The housing was installed on a test stand and argon flow regulated at 1.2 slpm through the filter. Argon gas was prepurified using a Waferpure® (Millipore) gas purifier. The downstream $H_2O$ and $O_2$ concentrations were measured using a Meeco Aquamatic Plus™ Moisture Analyzer and Hersch/Osaka Oxygen Model MK3/Y Trace Oxygen Analyzer, respectively. A Kin-Tek Span Pac™ 271 ATM Oxygen Generator was used to generate an $O_2$ challenge of 100–105 ppb. After installation of the filter and allowing to purge under argon overnight, the housing was heated by means of heating tape to 400° C. The oxygen challenge of 105 ppb was started and continued for one hour. During this period of time, no change in the baseline $O_2$ level of 0 ppb was detected by the downstream analyzer. See FIG. 5.

Example 3—Flow/ΔP of filter element.

Figure 4:
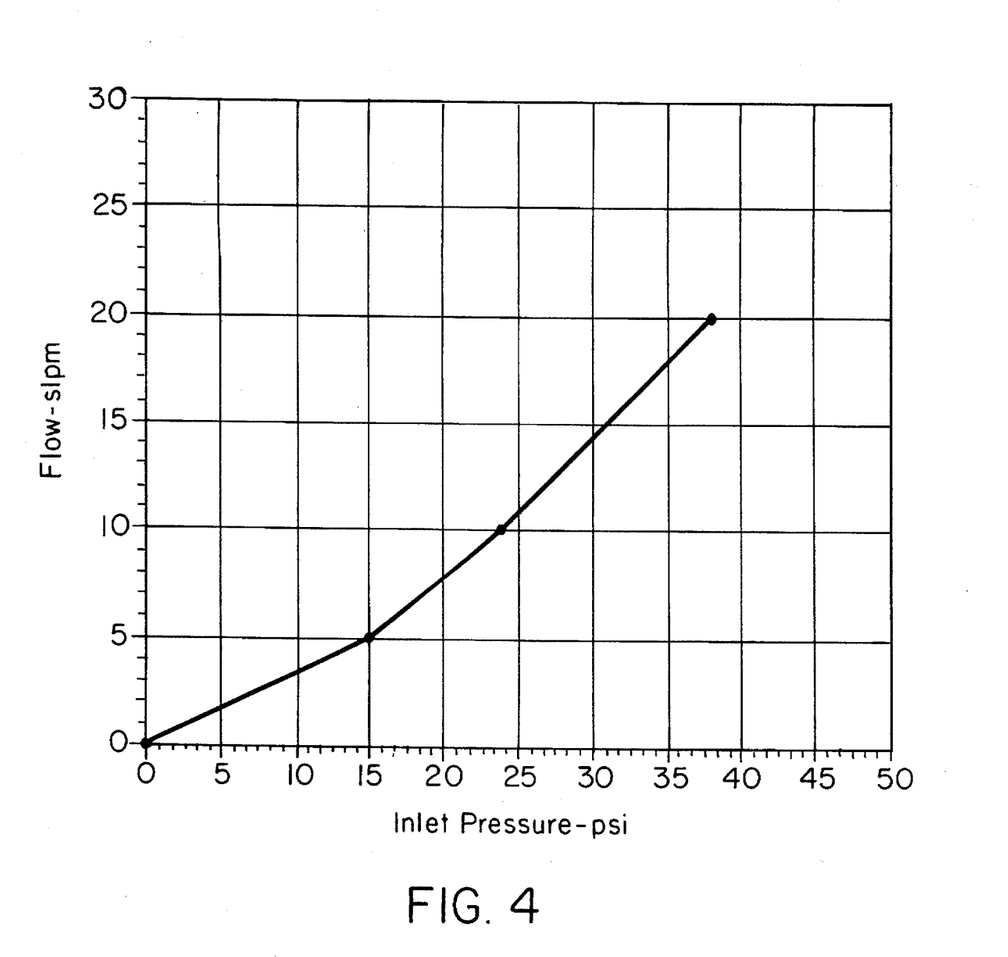
FIG. 4 is a plot of flow versus inlet pressure for a getter-filter element produced in accordance with the present invention showing its linear response.

This experiment shows the results of a Flow-Pressure drop test wherein a gas is introduced to the getter-filter at a known inlet pressure. FIG. 4 shows the pressure drop, relative to atmospheric, for a typical getter-filter with a flow area of approx 2.13 $cm^2$. The test was conducted by flowing air through the filter at a known inlet pressure, P1. The outlet pressure is atmosphere, P2. The pressure drop is calculated as P1-P2. Since P2 is atmospheric, or psig, the pressure drop for a given flow is simply the inlet pressure.

In the experiment, the inlet pressure P1 was changed and the associated flow measured. The pressure was measured using a standard pressure gage. The flow was measured using a standard mass flow meter calibrated for air.

FIG. 4 shows that the getter filter exhibited excellent flow-pressure drop characteristics, very similar to a simple filter device which would be used at the same flow rates.

Example 4

Figure 5:
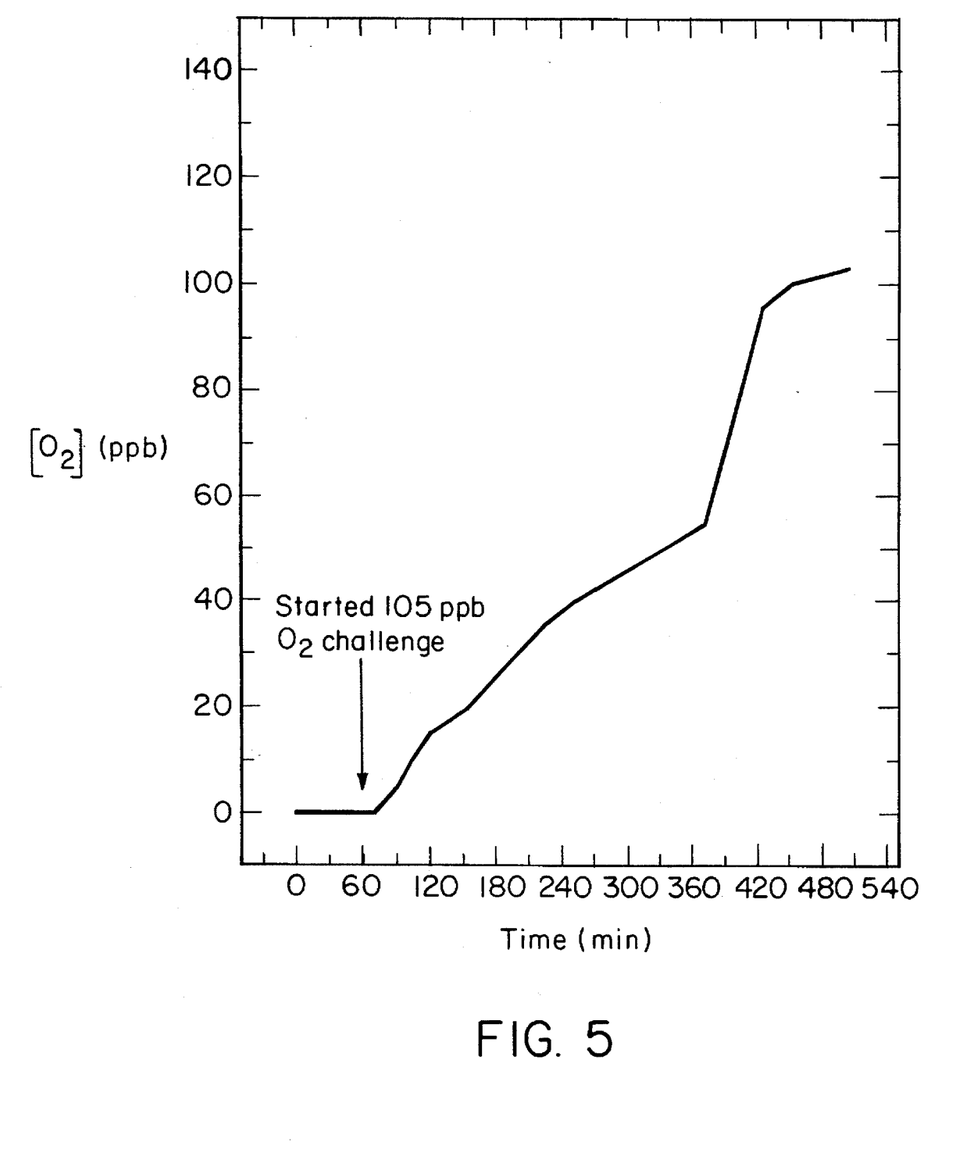
FIG. 5 is a plot of oxygen concentration measured exiting a getter-filter made in accordance with this invention with the getter-filter challenged with a constant concentration of oxygen (105 ppb), and the exit concentration measured over time.

The filter and housing of Example 2 were allowed to cool to room temperature under an inert argon gas flow. After one hour, the $O_2$ challenge of 105 ppb was resumed. No observable increase in $O_2$ concentration was observed for 10 minutes. After this time, the $O_2$ concentration gradually increased over six hours to the input level of 105 ppb, as shown in FIG. 5.

Example 5

The filter and housing of Example 4 were purged with argon and heated again to 400° C. The $O_2$ challenge of 105 ppb was resumed. No $O_2$ was detected downstream for over 6 days. The $H_2O$ concentration decreased during this period of time from an initial 40 ppb to 9 ppb.

Although the foregoing invention has been described by way of illustration and example for purposes of clarity and understanding, it will be obvious that certain changes and modifications may be practiced within the scope of the invention, as limited only by the scope of the appended claims.

We claim:

1. A getter-filter composite membrane element, comprising a sinterable getter material and a sinterable metal filter material, the composite element defining a matrix of substantially interconnected pores.

2. The getter-filter membrane element of claim 1 wherein said metal comprises nickel.

3. The getter-filter membrane element of claim 1 wherein said composite element is formed in a green form in the absence of a binder.

4. The getter-filter membrane element of claim 1 wherein the sinterable getter material optionally includes a sinterable metal.

5. The getter-filter membrane filter of claim 1 wherein the getter material comprises, by weight percent, Zr(82)-Ti(10)-Ni(5)-O(3).

6. A getter-filter composite membrane element, comprising: at least three alternating layers of a sinterable getter material layer and first and second sinterable metal filter material layers, the getter layer being located between the first and second filter layers, the composite element defining a matrix of substantially interconnected pores throughout the composite element.

7. The getter-filter membrane element of claim 6 wherein said metal comprises nickel.

8. The getter-filter membrane element of claim 6 wherein the sinterable getter material optionally includes a sinterable metal.

9. The getter-filter membrane filter of claim 6 wherein the getter material comprises, by weight percent, Zr(82)-Ti(10)-Ni(5)-O(3).

10. A getter-filter, comprising:
 a getter-filter composite membrane element comprising an integrally joined sinterable getter material and a sinterable metal filter material;
 a housing defining a fluid conduit, comprising a casing for retaining said getter-filter element therein, said casing having anterior and posterior fluid connections with said getter-filter element being located therebetween and being sealably joined to said casing, said housing thereby defining a fluid flow path; and
 means for sealably connecting said casing to a source of fluid to be filtered.

11. The getter-filter of claim 10 wherein said metal comprises nickel.

12. The getter-filter of claim 10 wherein said composite membrane element is formed in a green form in the absence of binder.

13. The getter-filter membrane element of claim 10 wherein the sinterable getter material optionally includes a sinterable metal.

14. The getter-filter membrane filter of claim 10 wherein the getter material comprises, by weight percent, Zr(S2)-Ti(10)-Ni(5)-O(3).

15. A method of making a multi-layer getter-filter composite membrane element comprising the steps of:
 a. making a sintered getter element;
 b. placing the sintered getter element in a mold and depositing a sintered dendritic metal layer on a first face of the getter element, thereby making a two-layer composite element;
 c. flipping the two-layer composite element thereby preparing the second face for layering; and
 d. making a second metal layer on the second face of the two-layer element, thereby making a multi-layer getter-filter composite membrane element.

16. The method of claim 15 wherein making said sintered getter element comprises:
 a. depositing a substantially uniform low-density bed of a sinterable getter material into a mold suitable for applying compressive force thereto;
 b. compressing said low-density bed of sinterable getter material to form a getter green form;
 c. sintering said getter green form at a first temperature; and
 d. compressing said getter green form at a first pressure to form said sintered getter element.

17. The method of claim 16 wherein depositing said substantially uniform low-density bed comprises air-laying said sinterable dendritic metal material into a mold suitable for applying compressive force thereto, said air-laid bed having a normal density less than or equal to the density of said sinterable dendritic metal material.

18. The method of claim 16 wherein compressing said substantially uniform low-density bed of sinterable dendritic metal material occurs at a pressure from about 500 psi to about 1500 psi.

19. The method of claim 16 wherein said sintered getter element is compressed at a second higher pressure, thereby imparting additional structural rigidity to said element.

20. The method of claim 15 wherein making said two-layer composite element comprises:
 a. depositing a substantially uniform low-density bed of a sinterable dendritic metal material onto a first face of the getter element located in a mold suitable for applying compressive force thereto;
 b. compressing said low-density bed of sinterable dendritic metal material onto the first face of the getter element to form a two-layer composite element green form;
 c. sintering said two-layer composite element green form at a second temperature; and
 d. compressing said two-layer composite green form at a second pressure to form said two-layer composite element.

21. The method of claim 15 wherein making said second metal layer comprises:
 a. depositing a substantially uniform low-density bed of a sinterable dendritic metal material onto the second face of the two-layer composite element located in said mold;
 b. compressing said low-density bed of sinterable dendritic metal material onto the second face of the two-layer composite element to form a three-layer composite element green form;

c. sintering said three-layer composite element green form at a second temperature; and d. compressing said three-layer composite green form at a second pressure to form said multi-layer composite element.

22. The method of claim 15 wherein said getter element is sintered at a temperature of from about 775° to about 825° C.

23. The method of claim 15 wherein said composite membrane element is separated into individual filter elements of a predetermined size.

24. The method of claim 23 wherein said composite membrane element is separated by wire EDM cutting.

25. The method of claim 15 wherein said composite membrane element is formed in a green form in the absence of a binder.

26. The method of claim 15 wherein said sinterable dendritic metal layer comprises a nickel metal layer.

27. A method of making a getter-filter composite membrane element comprising the steps of:

a. depositing a substantially uniform low-density bed of a sinterable metal material into a mold suitable for applying compressive force thereto;

b. compressing said low-density bed of sinterable metal material to form a first metal green form;

c. repeating steps a.–b. substituting a sinterable getter material to make a getter green form on top of the first metal green form;

d. repeating steps a.–b. to make a second metal green form on top of the getter green form, thereby forming a composite green form;

e. removing the three-layer composite green form; and f. sintering the composite green form.

28. A product made by any one of the methods of claims 15–19.

* * * * *